(12) United States Patent
Odate

(10) Patent No.: US 12,528,533 B2
(45) Date of Patent: Jan. 20, 2026

(54) STEERING DEVICE

(71) Applicant: HONDA MOTOR CO., LTD., Tokyo (JP)

(72) Inventor: Shotaro Odate, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/729,512

(22) PCT Filed: Jan. 17, 2022

(86) PCT No.: PCT/JP2022/001394
§ 371 (c)(1),
(2) Date: Jul. 17, 2024

(87) PCT Pub. No.: WO2023/135806
PCT Pub. Date: Jul. 20, 2023

(65) Prior Publication Data
US 2025/0065941 A1 Feb. 27, 2025

(51) Int. Cl.
*B62D 1/04* (2006.01)
*B62D 1/08* (2006.01)
(52) U.S. Cl.
CPC .............. *B62D 1/046* (2013.01); *B62D 1/08* (2013.01)
(58) Field of Classification Search
CPC . B62D 1/04; B62D 1/046; B62D 1/08; H03K 17/955; H01H 2239/006; A61B 5/00
See application file for complete search history.

(56) References Cited

U.S. PATENT DOCUMENTS

| | | | |
|---|---|---|---|
| 10,822,015 B2* | 11/2020 | Sasaki | B60Q 3/283 |
| 11,975,754 B2* | 5/2024 | Osako | H03K 17/955 |
| 2008/0238695 A1 | 10/2008 | Yanai et al. | |
| 2017/0183025 A1 | 6/2017 | Okazaki et al. | |
| 2018/0107294 A1* | 4/2018 | Stotzem | G06F 3/03547 |
| 2021/0371001 A1 | 12/2021 | Osako et al. | |
| 2024/0174282 A1* | 5/2024 | Odate | B62D 1/046 |
| 2024/0286676 A1* | 8/2024 | Odate | B62D 1/04 |

(Continued)

FOREIGN PATENT DOCUMENTS

| | | | |
|---|---|---|---|
| CN | 112249146 A | 1/2021 | |
| CN | 116443090 A * | 7/2023 | B62D 1/046 |

(Continued)

*Primary Examiner* — Adam D Rogers
(74) *Attorney, Agent, or Firm* — CKC & Partners Co., LLC

(57) ABSTRACT

The steering device 1 is equipped with: a steering wheel 2 provided with a rim section 20 and spoke sections 25L and 25R; electrode devices 6L, 6R; and a steering control device 4 for detecting a change in the capacitance of the electrode devices 6L, 6R. The electrode devices 6L, 6R are respectively equipped with a first electrode section 61L, 61R provided to a spoke connection section 22L, 22R and which constitutes part of an inner-circumferential rim section 21. Radially outermost sections 613L, 613R, which are the sections of the first electrode sections 61L, 61R farthest from the center, are positioned to the outside in the radial direction of arc-shaped imaginary lines L1, L2 which contact the contour line of the inner-circumferential rim section 21 above the spoke sections 25L, 25R and the contour line of the inner-circumferential rim section 21 below the spoke sections 25L, 25R.

5 Claims, 5 Drawing Sheets

(56) References Cited

U.S. PATENT DOCUMENTS

| | | | | |
|---|---|---|---|---|
| 2024/0361156 A1* | 10/2024 | Masaki | .................... | G01D 5/24 |
| 2025/0065942 A1* | 2/2025 | Odate | ...................... | B62D 1/08 |

FOREIGN PATENT DOCUMENTS

| | | | | | |
|---|---|---|---|---|---|
| JP | 2002085360 | A | | 3/2002 | |
| JP | 2008237378 | A | | 10/2008 | |
| JP | 2023044967 | A | * | 4/2023 | |
| WO | 2016013180 | A1 | | 1/2016 | |
| WO | WO-2019058895 | A1 | * | 3/2019 | ............ B60K 35/00 |
| WO | 2020195620 | A1 | | 10/2020 | |

* cited by examiner

STEERING DEVICE

TECHNICAL FIELD

The present invention relates to a steering device. More specifically, the present invention relates to a steering device that receives steering operation by a driver.

BACKGROUND ART

In recent years, in order to improve traffic safety, vehicles have been equipped with a driving support device that assists a driver in driving a vehicle, such as a lane keep function, a lane deviation suppression function, a lane change function, and a preceding vehicle following function. In the vehicle equipped with such a driving support device, in some cases, a sensor device as described in Patent Document 1 detects whether a driver is gripping a steering wheel and, when it is detected that the driver is not gripping the steering wheel, the driver is urged to grip the steering wheel or a driving support function being executed is cancelled.

The sensor device described in Patent Document 1 detects, based on a change in the capacitance of an electrode provided in a spoke part of the steering wheel, that a hand of the driver is in contact with or has approached the steering wheel.

CITATION LIST

Patent Document

Patent Document 1: PCT International Publication No. WO2020/195620

DISCLOSURE OF THE INVENTION

Problems to be Solved by the Invention

The sensor device described in Patent Document 1 includes a plate-like electrode that is provided in the spoke part such that a plane of the plate-like electrode faces the driver. Since a line of electric force induced around the electrode passes perpendicularly to the electrode, the sensor device described in Patent Document 1 sometimes cannot accurately detect the presence of a hand gripping an annular rim part provided radially outward of, and connected to, the spoke part. In particular, accuracy of detecting a hand gripping the rim part at a portion belonging to the portion connected to the spoke part and located radially outside is low.

In order to improve traffic safety, an object of the present invention is to provide a steering device that can accurately detect the presence of a hand of a driver gripping a rim part.

Means for Solving the Problems (1) A steering device according to the present invention is a steering device that receives steering operation by a driver, the steering device including: a steering wheel including an annular rim part, a hub part provided inside the rim part, and a spoke part extending in a radial direction of the rim part and connecting the hub part to a rim-inner-circumferential portion of the rim part; an electrode provided in the steering wheel; and a controller configured to detect a change in capacitance of the electrode device. The electrode device includes a first electrode portion provided in a connection portion which belongs to the rim-inner-circumferential portion and to which the spoke part is connected.

(2) In this case, it is preferable that a radially outermost portion that is a portion most distant from the hub part in the radial direction in the first electrode portion is disposed further outside in the radial direction than an arc-shaped virtual line that is in contact with a contour line of the rim-inner-circumferential portion located above the spoke part when viewed from the driver and a contour line of the rim-inner-circumferential portion located below the spoke part when viewed from the driver.

(3) In this case, it is preferable that a portion belonging to the first electrode portion and including the radially outermost portion is bow-shaped when viewed from the driver and has a plane facing outward in the radial direction.

(4) In this case, it is preferable that the spoke part is provided with an auxiliary equipment operation console that receives auxiliary equipment operation by the driver and is rectangular when viewed from the driver, and the first electrode portion is L-shaped when viewed from the driver and includes: a first flat portion provided along a first sidewall surface that belongs to the auxiliary equipment operation console and is located upward when viewed from the driver, the first flat portion having a plane that faces the rim-inner-circumferential portion; and a second flat portion provided at a position separated outward in the radial direction from a second sidewall surface that belongs to the auxiliary equipment operation console and is located outward when viewed from the driver.

(5) In this case, it is preferable that the second flat portion has a lower end as viewed from the driver, and the lower end is Y-shaped and has a plane facing a space between a lower side of the spoke part when viewed from the driver and the rim-inner-circumferential portion.

(6) In this case, it is preferable that the spoke part is provided with an auxiliary equipment operation console that receives auxiliary equipment operation by the driver and is rectangular when viewed from the driver, and the first electrode portion is C-shaped when viewed from the driver and includes: a first flat portion provided along a first sidewall surface that belongs to the auxiliary equipment operation console and is located upward when viewed from the driver in the auxiliary equipment operation console, the first flat portion having a plane that faces the rim-inner-circumferential portion; a second flat portion provided at a position separated outward in the radial direction from a second sidewall surface that belongs to the auxiliary equipment operation console and is located outward in the radial direction when viewed from the driver; and a third flat portion provided along a third sidewall surface that belongs to the auxiliary equipment operation console and is located downward when viewed from the driver, the third flat portion having a plane that faces the rim-inner-circumferential portion.

(7) In this case, it is preferable that the electrode device further includes a second electrode portion provided adjacent to a rear surface side of the auxiliary equipment operation console and having a plane facing toward the driver.

Effects of the Invention (1) The steering device includes: the steering wheel including the rim part, the hub part, and the spoke part; the electrode provided in the steering wheel, and the controller that detects a change in the capacitance of the electrode. In the steering device according to the present invention, the electrode device includes the first electrode portion provided in the connection portion which belongs to the rim-inner-circumferential portion and to which the spoke part is connected. Due to this feature of the present invention, the first electrode portion provided in the connection portion closer to the rim part than the spoke part can induce a line of electric force passing, in particular, in a vicinity of the connection portion in the rim part. This feature makes it possible to more accurately detect a hand of the driver that is in contact with or approaches the rim part, in comparison with the known art in which the electrode is provided in the spoke part, thereby contributing to improvement of traffic safety.

(2) In the present invention, the radially outermost portion, which is the portion most distant from the hub part in the radial direction in the first electrode portion, is disposed further outside in the radial direction than the arc-shaped virtual line that is in contact with both of the contour line of the rim-inner-circumferential portion located above the spoke part when viewed from the driver and the contour line of the rim-inner-circumferential portion located below the spoke part. Due to this feature, many lines of electric force can be induced in a portion of the rim part located further outside in the radial direction than the connection portion, more specifically, a portion near 90° that can be gripped by the right hand of the driver or a portion near 270° that can be gripped by the left hand of the driver. Therefore, it is possible to accurately detect the hands of the driver that are in contact with or approach these portions, thereby contributing to improvement of traffic safety.

(3) In the steering device according to the present invention, the portion belonging to the first electrode portion and including the radially outermost portion has a bow shape conforming to the rim part when viewed from the driver and has the plane facing outward in the radial direction. Due to this feature of the present invention, more lines of electric force can be induced in, in particular, a portion of the rim part further outside in the radial direction than the connection portion, more specifically, a portion near 90° that can be gripped by the right hand of the driver or a portion near 270° that can be gripped by the left hand of the driver. Therefore, it is possible to more accurately detect the hands of the driver that are in contact with or approach these portions, thereby contributing to improvement of traffic safety.

(4) In the steering device according to the present invention, the first electrode portion is L-shaped when viewed from the driver and includes: the first flat portion provided along the first sidewall surface that belongs to the auxiliary equipment operation console and is located upward when viewed from the driver and having the plane that faces the rim-inner-circumferential portion; and the second flat portion provided at the position separated outward in the radial direction from the second sidewall surface that belongs to the auxiliary equipment operation console and is located outward in the radial direction when viewed from the driver. Due to this feature, in the present invention, many lines of electric force can be induced in a vicinity of a portion in a range of 60° to 90° of the annular rim part that can be gripped by the right hand of the driver or in a vicinity of a portion in a range of 270° to 300° of the annular rim part that can be gripped by the left hand of the driver. Therefore, it is possible to accurately detect the hands of the driver that are in contact with or approach the ranges of the rim part, thereby contributing to improvement of traffic safety.

(5) In the steering device according to the present invention, the lower end of the second flat portion as viewed from the driver has the plane that is Y-shaped when viewed from the driver and that faces the space between the lower side of the spoke part and the rim-inner-circumferential portion. Due to this feature, a line of electric force passing below the spoke part in the rim part can be induced. Therefore, it is possible to accurately detect a hand of the driver that is in contact with or approaches the rim part, thereby contributing to improvement of traffic safety.

(6) In the steering device according to the present invention, the first electrode portion is C-shaped when viewed from the driver and includes: the first flat portion provided along the first sidewall surface that belongs to the auxiliary equipment operation console and is located upward when viewed from the driver and having the plane that faces the rim-inner-circumferential portion; the second flat portion provided at the position separated outward in the radial direction from the second sidewall surface that belongs to the auxiliary equipment operation console and is located outward in the radial direction when viewed from the driver; and the third flat portion provided along the third sidewall surface that belongs to the auxiliary equipment operation console and is located downward when viewed from the driver and having the plane that faces the rim-inner-circumferential portion. Due to this feature of the present invention, many lines of electric force can be induced in a vicinity of a portion in a range of 60° to 120° of the annular rim part that can be gripped by the right hand of the driver or in a vicinity of a portion in a range of 240° to 300° of the annular rim part that can be gripped by the left hand of the driver. Therefore, it is possible to accurately detect the hands of the driver that are in contact with or approach the ranges of the rim part, thereby contributing to improvement of traffic safety.

(7) In the present invention, the second electrode portion having the plane facing toward the driver is provided adjacent to the rear surface side of the auxiliary equipment operation console. Due to this feature, many lines of electric force can be induced near the spoke part. Therefore, it is possible to also detect a hand of the driver that is in contact with or approaches the spoke part, thereby contributing to improvement of traffic safety.

PREFERRED MODE FOR CARRYING OUT THE INVENTION

First Embodiment

A steering device according to a first embodiment of the present invention will be described below with reference to the drawings.

Figure 1:
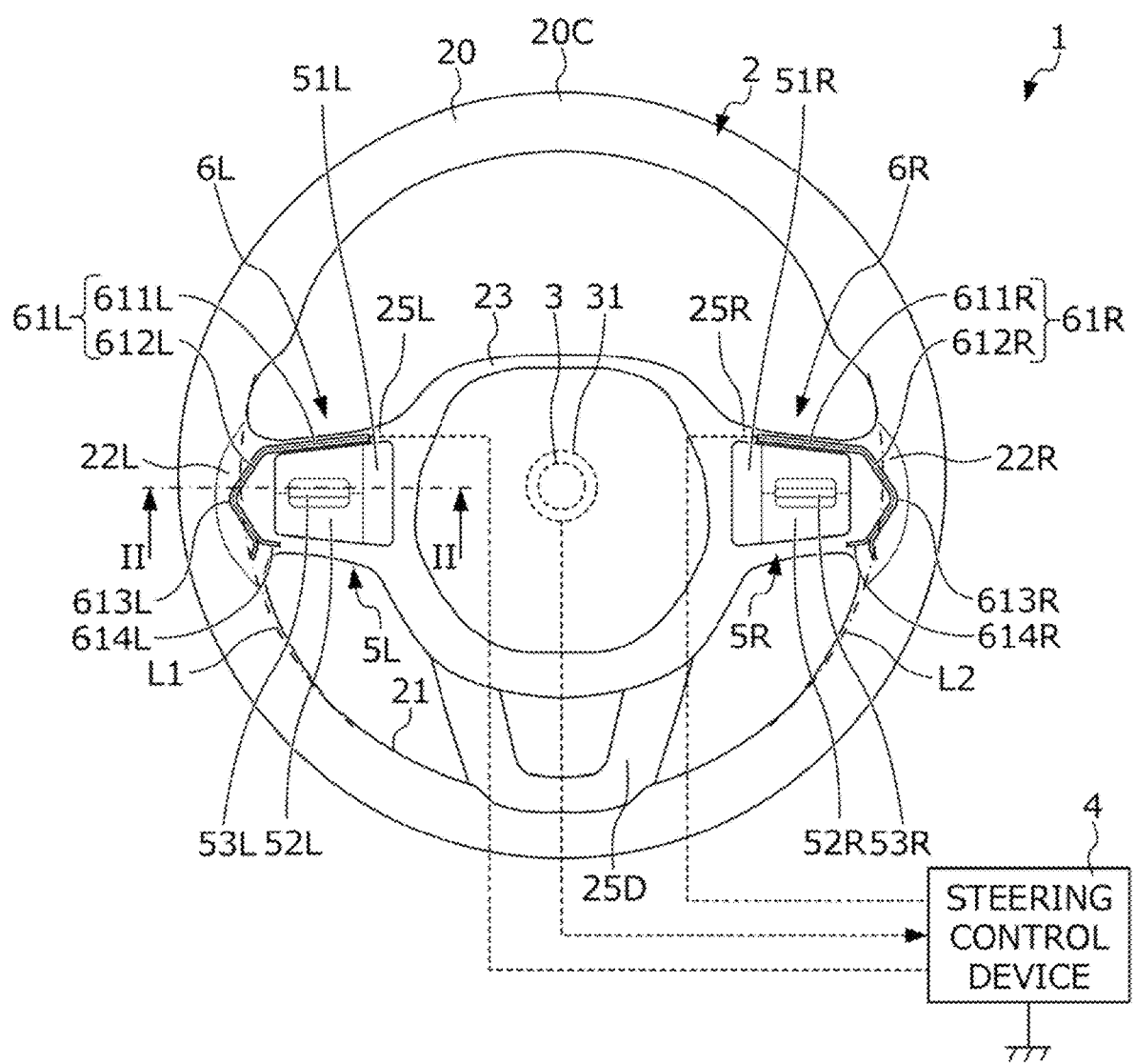
FIG. 1 is a diagram illustrating a configuration of a steering device according to a first embodiment of the present invention.

FIG. 1 is a diagram illustrating a configuration of a steering device 1 according to the present embodiment. The steering device 1 includes a steering wheel 2 that receives steering operation for a vehicle, auxiliary equipment operation on vehicle auxiliary equipment, and the like by a driver, a steering shaft 3 that pivotally supports the steering wheel 2, and a steering control device 4.

The steering wheel 2 includes a rim part 20 that is annular and can be gripped by the driver, a hub part 23 provided inside the rim part 20, and three spoke parts 25L, 25R, and 25D extending from the hub part 23 in the radial direction of the rim part 20 and connected to a rim-inner-circumferential portion 21 of the rim part 20.

The hub part 23 has a disk-like shape, is provided, for example, at the center of the rim part 20 as viewed from the driver, and constitutes the center of the steering wheel 2. The steering shaft 3 that has a shaft-like shape and pivotally supports the steering wheel 2 and transmits steering torque generated by the driver rotating the steering wheel 2 to a steering mechanism (not shown) is connected to the rear surface side of the hub part 23 as viewed from the driver. The steering shaft 3 is provided with a torque sensor 31 that detects the steering torque acting on the steering shaft 3 and outputs a signal corresponding to a detection value to the steering control device 4.

The rim part 20 and the hub part 23 are connected via the three spoke parts 25L, 25R, and 25D. The spoke part 25L on the left extends in the horizontal direction and connects a left side portion of the hub part 23 as viewed from the driver to a left side portion of the rim-inner-circumferential portion 21 as viewed from the driver. The spoke part 25R on the right extends in parallel to the left spoke part 25L and in the horizontal direction and connects a right side portion of the hub part 23 as viewed from the driver to a right side portion of the rim-inner-circumferential portion 21 as viewed from the driver. The spoke part 25D in a lower part extends orthogonally to the spoke parts 25L and 25R and in the vertical direction and connects a lower side portion of the hub part 23 as viewed from the driver to a lower side portion of the rim-inner-circumferential portion 21 as viewed from the driver.

In the following description, the positions of the rim part 20 having a substantially circular shape as viewed from the driver, the rim-inner-circumferential portion 21, the hub part 23, and the steering shaft 3, and the orientations of the spoke parts 25L, 25R, and 25D may be represented by a clockwise angle [°] centered on the steering shaft 3, with respect to an upper end 20C of the rim part 20 as viewed from the driver, as a reference. That is, the right spoke part 25R extends in a 90-degree direction and connects the hub part 23 to a 90-degree portion of the rim-inner-circumferential portion 21. The lower spoke part 25D extends in a 180-degree direction and connects the hub part 23 to a 180-degree portion of the rim-inner-circumferential portion 21. The left spoke part 25L extends in a 270-degree direction and connects the hub part 23 to a 270-degree portion of the rim-inner-circumferential portion 21.

The left spoke part 25L and the right spoke part 25R are respectively provided with a left auxiliary equipment operation console unit 5L and a right auxiliary equipment operation console unit 5R for receiving auxiliary equipment operation that the driver performs to operate vehicle auxiliary equipment (not shown; e.g., an audio device and a car navigation device) and a left electrode device 6L and a right electrode device 6R for detecting the hands of the driver into contact with or approaching the steering wheel 2. These auxiliary equipment operation console units 5L and 5R are respectively rectangular when viewed from the driver. The driver can operate the vehicle auxiliary equipment by operating, with fingers, a plurality of switches 51L, 52L, 53L, 51R, 52R, and 53R provided to these auxiliary equipment operation console units 5L and 5R.

Figure 2:
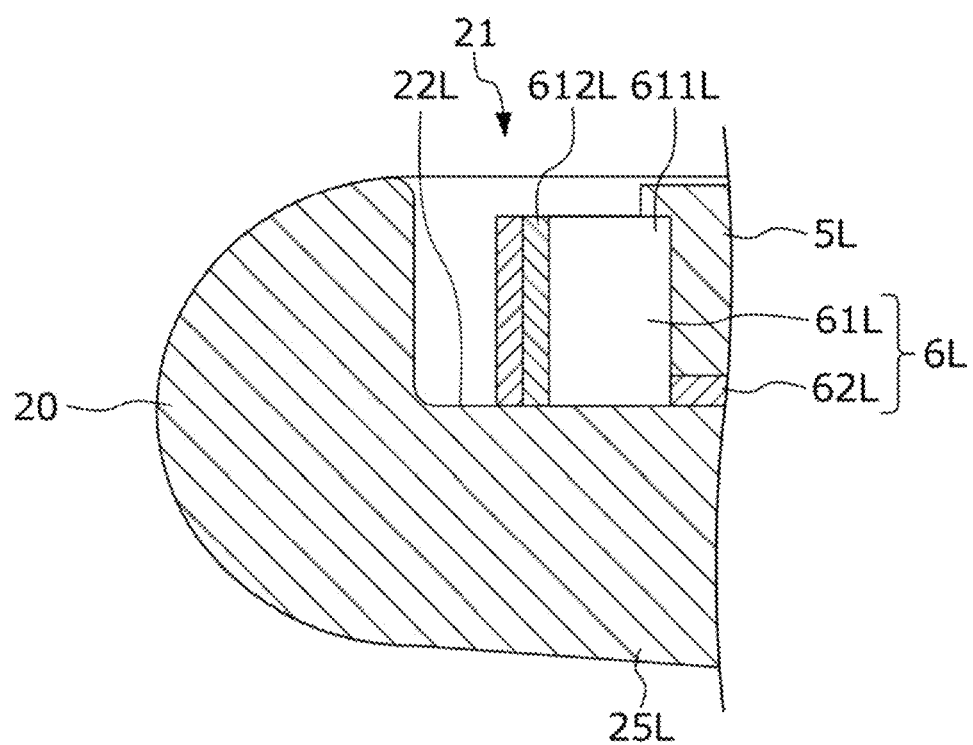
FIG. 2 is a sectional view of a rim part and a left spoke part taken along a line II-II extending in a radial direction in FIG. 1.

FIG. 2 is a sectional view of the rim part 20 and the left spoke part 25L, taken along a line II-II extending in the radial direction in FIG. 1. As illustrated in FIG. 2, a left spoke connection portion 22L, which belongs to the rim-inner-circumferential portion 21 and to which the left spoke part 25L is connected, is concave when viewed from the driver side (that is, the upward side in FIG. 2). Although illustration by a sectional view is omitted, a right spoke connection portion 22R, which belongs to the rim-inner-circumferential portion 21 and to which the right spoke part 25R is connected, is also concave when viewed from the driver side.

Figure 3:
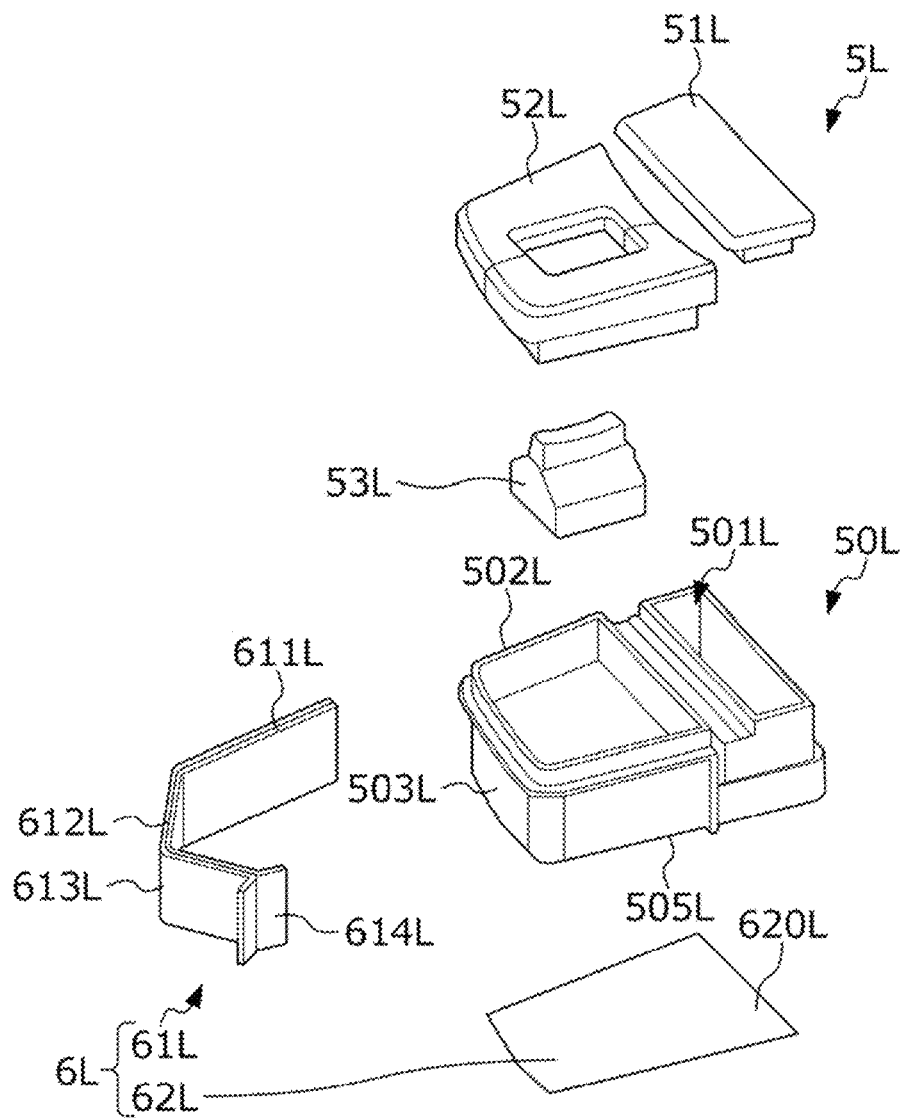
FIG. 3 is an exploded perspective view of a left auxiliary equipment operation console unit and a left electrode device.

FIG. 3 is an exploded perspective view of the left auxiliary equipment operation console unit 5L and the left electrode device 6L. The left auxiliary equipment operation console unit 5L includes a plurality of lid-shaped switches 51L, 52L, and 53L that receive auxiliary equipment operation by the driver and a console main body 50L that supports these switches 51L, 52L, and 53L.

The console main body 50L has a columnar shape and appears rectangular when viewed from the driver. The plurality of switches 51L, 52L, and 53L respectively have a lid-like shape and attached to an upper surface 501L of the console main body 50L facing the driver.

The left electrode device 6L includes a first electrode portion 61L provided along sidewall surfaces 502L and 503L of the console main body 50L and a second electrode portion 62L provided adjacent to a rear surface 505L of the console main body 50L as viewed from the driver.

The first electrode portion 61L is formed by bending a conductive plate material and is L-shaped when viewed from the driver. More specifically, the first electrode portion 61L includes a first flat portion 611L that extends along the first sidewall surface 502L belonging to the console main body 50L and located upward when viewed from the driver, and a second flat portion 612L that extends along a second sidewall surface 503L belonging to the console main body 50L and located on the left side (i.e., the radially outer side of the rim part 20) as viewed from the driver and that is bow-shaped when viewed from the driver.

The first electrode portion 61L is attached to the left spoke part 25L and the left spoke connection portion 22L together with the console main body 50L such that the first flat portion 611L is provided along the first sidewall surface 502L and the second flat portion 612L faces the second sidewall surface 503L and is provided at a position slightly separated outward in the radial direction from the second sidewall surface 503L. Accordingly, as illustrated in FIGS. 1 and 2, the first electrode portion 61L is provided in the left spoke part 25L and the left spoke connection portion 22L such that a radially outer plane of the first flat portion 611L faces the rim-inner-circumferential portion 21 and a radially outer plane of the second flat portion 612L faces outward in the radial direction.

As illustrated in FIG. 1, in a state in which the first electrode portion 61L is provided in the left spoke part 25L and the left spoke connection portion 22L, a radially outermost portion 613L, which is a portion most distant from the hub part 23 in the radial direction in the first electrode portion 61L, is disposed further outside in the radial direction than an arc-shaped virtual line L1 that is in contact with both contour lines of the rim-inner-circumferential portion 21 respectively located above and below the left spoke part 25L when viewed from the driver.

The second flat portion 612L of the first electrode portion 61L has a lower end as viewed from the driver, and the lower end branches into a Y-shape and has a plane 614L facing a space between the lower side of the left spoke part 25L as viewed from the driver and the rim-inner-circumferential portion 21.

Referring back to FIG. 3, the second electrode portion 62L is made of the same conductive plate material as the first electrode portion 61L and is provided adjacent to the rear surface 505L of the console main body 50L as viewed from the driver. Accordingly, in a state in which the second electrode portion 62L is provided in the left spoke part 25L together with the console main body 50L, the second electrode portion 62L has a surface 620L facing in a direction orthogonal to the first electrode portion 61L, that is, facing the driver.

The specific configurations of the left auxiliary equipment operation console unit 5L and the left electrode device 6L have been described above with reference to FIGS. 1 to 3. Note that specific configurations of the right auxiliary equipment operation console unit 5R and the right electrode device 6R are substantially the same as those of the left auxiliary equipment operation console unit 5L and the left electrode device 6L, except for disposition positions and orientations thereof. Therefore, in the following description, differences from the left auxiliary equipment operation console unit 5L and the left electrode device 6L are mainly described, and illustration and detailed description of the same components as those of the left auxiliary equipment operation console unit 5L and the left electrode device 6L will be omitted as appropriate.

The right auxiliary equipment operation console unit 5R includes a plurality of lid-shaped switches 51R, 52R, and 53R that receive auxiliary equipment operation by the driver and a columnar console main body (not illustrated) that supports these switches 51R, 52R, and 53R.

The right electrode device 6R includes a first electrode portion 61R provided along sidewall surfaces of the console main body and a second electrode portion (not illustrated) provided adjacent to a rear surface side of the console main body as viewed from the driver.

The first electrode portion 61R is formed by bending a conductive plate material and has an L-shape when viewed from the driver. More specifically, the first electrode portion 61R includes a first flat portion 611R that extends along a first sidewall surface belonging to the console main body and located upward as viewed from the driver, and a second flat portion 612R that extends along a second sidewall surface belonging to the console main body and located on the right side (i.e., the radially outer side of the rim part 20) as viewed from the driver and that is bow-shaped when viewed from the driver.

The first electrode portion 61R is attached to the right spoke part 25R and the right spoke connection portion 22R together with the console main body such that the first flat portion 611R is provided along the first sidewall surface of the console main body and the second flat portion 612R faces the second sidewall surface of the console main body and is provided at a position slightly separated outward in the radial direction from the second sidewall surface. Accordingly, as illustrated in FIG. 1, the first electrode portion 61R is provided in the right spoke part 25R and the right spoke connection portion 22R such that a radially outer plane of the first flat portion 611R faces the rim-inner-circumferential portion 21 and a radially outer plane of the second flat portion 612L faces outward in the radial direction.

As illustrated in FIG. 1, in a state in which the first electrode portion 61R is provided in the right spoke part 25R and the right spoke connection portion 22R, a radially outermost portion 613R, which is a portion most distant from the hub part 23 in the radial direction and belongs to the first electrode portion 61R, is disposed further outside in the radial direction than an arc-shaped virtual line L2 that is in contact with both contour lines of the rim-inner-circumferential portion 21 respectively located above and below the right spoke part 25R when viewed from the driver.

The second flat portion 612R of the first electrode portion 61R has a lower end as viewed from the driver, and the lower end branches in a Y shape and has a plane 614R facing a space between the lower side of the right spoke part 25R as viewed from the driver and the rim-inner-circumferential portion 21.

Although not illustrated, a second electrode portion of the right electrode device 6R is made of the same conductive plate material as the first electrode portion 61R and is provided adjacent to the rear surface side of the console main body as viewed from the driver. Accordingly, in a state in which the second electrode portion is provided in the right spoke part 25R together with the console main body, the surface of the second electrode portion faces in a direction orthogonal to the first electrode portion 61R, that is, faces the driver.

Figure 4:
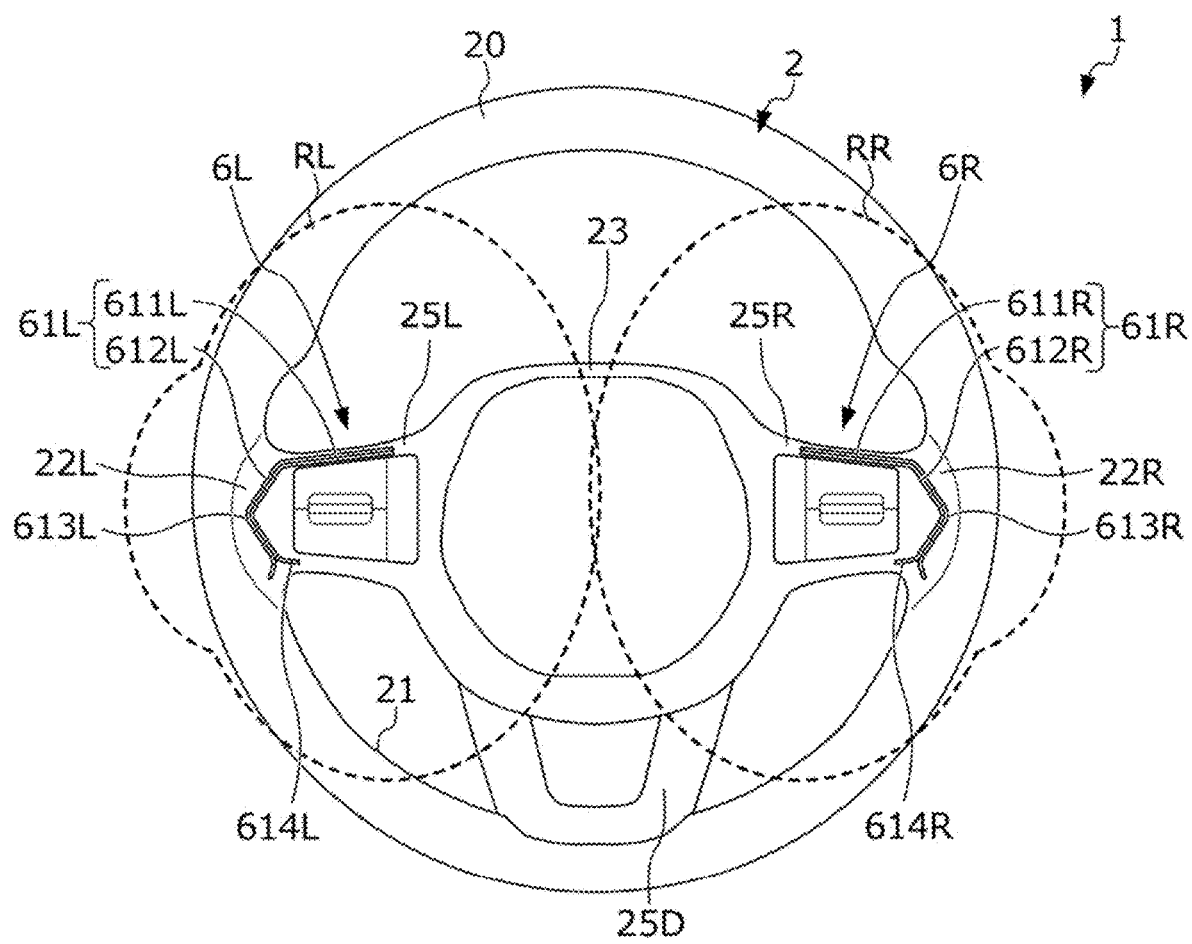
FIG. 4 is a diagram schematically illustrating a range of lines of electric force induced around electrode devices provided in spoke parts by applying a predetermined voltage to the electrode devices.

FIG. 4 is a diagram schematically illustrating ranges RL and RR of lines of electric force induced around the electrode devices 6L and 6R described above by applying a predetermined voltage to the electrode devices 6L and 6R.

As described above, the first electrode portions 61L and 61R of the electrode devices 6L and 6R include the first flat portions 611L and 611R and the second flat portions 612L and 612R facing outward in the radial direction. Accordingly, the ranges RL and RR of the lines of electric force induced around the electrode devices 6L and 6R by applying a voltage to the electrode devices 6L and 6R respectively include, in the rim part 20, a range of 270° to 300° that the first and second flat portions 611L and 612L face and a range of 60° to 90° that the first and second flat portions 611R and 612R face.

In particular, in the present embodiment, the second flat portions 612L and 612R are provided in the spoke connection portions 22L and 22R closer to the rim part 20 than the spoke parts 25L and 25R. More specifically, the radially outermost portions 613L and 613R that are most distant from the hub part 23 in the radial direction in the second flat portions 612L and 612R are disposed further outside in the radial direction than the virtual lines L1 and L2. Accordingly, in a vicinity of 270° and a vicinity of 90° in the ranges RL and RR of the lines of electric force induced around the electrode devices 6L and 6R, the lines of electric force can be induced to a further distance in the radial direction in comparison with the rest of the ranges RL and LL.

The lower ends of the second flat portions 612L and 612R of the electrode devices 6L and 6R as viewed from the driver include the planes 614L and 614R respectively facing the spaces between the lower sides of the spoke parts 25L and 25R and the rim-inner-circumferential portion 21. Accordingly, the ranges RL and RR of the lines of electric force induced around the electrode devices 6L and 6R by applying a voltage to the electrode devices 6L and 6R include, in the rim part 20, a range of 240° to 270° that the plane 614L faces and a range of 90° to 120° the plane 614R faces.

Referring back to FIG. 1, the steering control device 4 detects a change in capacitance between the electrode device 6L and the ground and a change in capacitance between the electrode device 6R and the ground, and determines, based on the changes in the capacitances of the electrode devices 6L and 6R and steering torque detected by the torque sensor 31, whether the steering wheel 2 is gripped by the driver. More specifically, when the steering torque detected by the torque sensor 31 is equal to or greater than a predetermined torque threshold set for the vicinity of 0 or when a change in the capacitance of one of the electrode devices 6L and 6R from a predetermined reference value is equal to or greater than a predetermined capacitance threshold, the steering control device 4 determines that the driver is gripping the steering wheel 2. When the steering torque is less than the torque threshold and change in capacitances of both the electrode devices 6L and 6R are less than the capacitance threshold, the steering control device 4 determines that the driver is not gripping the steering wheel 2.

Here, for example, when driving at a high speed, it is almost unnecessary to perform steering operation. Therefore, the driver often grips the steering wheel 2 with both their hands on the 90-degree portion and the 270-degree portion of the rim part 20. However, in this case, steering torque is sometimes less than the torque threshold even though the driver is gripping the steering wheel 2. Accordingly, it cannot be appropriately determined, with only a detection signal of the torque sensor 31, whether the steering wheel 2 is gripped by the driver. In contrast, according to the present embodiment, the steering control device 4 determines whether the steering wheel 2 is gripped by the driver based on the detection signal from the torque sensor 31 and the changes in capacitances of the two electrode devices 6L and 6R as described above, thereby making it possible to accurately determine whether the steering wheel 2 is gripped by the driver even in a situation in which the determination is hard to make based only on the signal from the torque sensor 31.

The steering device 1 according to the present embodiment exerts the following effects.

(1) The steering device 1 includes the steering wheel 2 including the rim part 20, the hub part 23, and spoke parts 25L and 25R, the electrode devices 6L and 6R provided in the steering wheel 2, and the steering control device 4 that detects changes in capacitances of the electrode devices 6L and 6R. In the steering device 1, the electrode devices 4L and 4R include the first electrode portions 61L and 61R provided in the spoke connection portions 22L and 22R which belong to the rim-inner-circumferential portion 21 and to which the spoke part 25L and 25R are connected. Thus, in the steering device 1, the first electrode portions 61L and 61R provided in the spoke connection portion 22L and 22R closer to the rim part 20 than the spoke parts 25L and 25R can induce lines of electric force passing, in particular, in the vicinity of the spoke connection portions 22L and 22R in the rim part 20. This feature makes it possible to more accurately detect the hands of the driver that are in contact with or approach the rim part, in comparison with the known art in which the electrodes are provided in the spoke parts 25L and 25R, thereby contributing to improvement of traffic safety.

(2) In the steering device 1, the radially outermost portions 613L and 613R, which are the portions most distant from the hub part 23 in the radial direction in the first electrode portions 61L and 61R, are disposed further outside in the radial direction than the arc-shaped virtual lines L1 and L2 that are in contact with both of the contour line of the rim-inner-circumferential portion 21 located above the spoke parts 25L and 25R when viewed from the driver and the contour line of the rim-inner-circumferential portion 21 located below the spoke parts 25L and 25R when viewed from the driver. Due to this feature, many lines of electric force can be induced in a portion of the rim part 20 located further outside in the radial direction than the spoke connection portions 22L and 22R in the rim part 20, more specifically, a portion near 90° that can be gripped by the right hand of the driver and a portion near 270° that can be gripped by the left hand of the driver. Therefore, it is possible to accurately detect the hands of the driver that are in contact with or approach these portions, thereby contributing to improvement of traffic safety.

(3) In the steering device 1, the portions belonging to the first electrode portions 61L and 61R and including the radially outermost portions 613L and 613R have bow shapes conforming to the rim part 20 when viewed from the driver and has the plane facing outward in the radial direction. Due to this feature, in the steering device 1, more lines of electric force can be induced in, in particular, portions of the rim part 20 further outside in the radial direction than the spoke connection portions 22L and 22R, more specifically, a portion near 90° that can be gripped by the right hand of the driver and a portion near 270° that can be gripped by the left hand of the driver. Therefore, it is possible to more accurately detect the hands of the driver that are in contact with or approach these portions, thereby contributing to improvement of traffic safety.

(4) In the steering device 1, the first electrode portions 61L and 61R are L-shaped when viewed from the driver and include: the first flat portion 611L provided along the first sidewall surface that belongs to the auxiliary equipment operation console units 5L and 5R and is located upward when viewed from the driver and having the plane that faces the rim-inner-circumferential portion 21; and the second flat portions 612L and 612R provided at the position separated outward in the radial direction from the second sidewall surfaces that belongs to the auxiliary equipment operation console units 5L and 5R and are located outward in the radial direction when viewed from the driver. Due to this feature, in the steering device 1, many lines of electric force can be induced in a portion in a range of 60° to 90° of the annular rim part 20 that can be gripped by the right hand of the driver and a portion in a range of 270° to 300° of the annular rim part 20 that can be gripped by the left hand of the driver. Therefore, it is possible to accurately detect the hands of the driver that are in contact with or approach the ranges of the rim part 20, thereby contributing to improvement of traffic safety.

(5) In the steering device 1, the lower ends of the second flat portions 612L and 612R as viewed from the driver have the planes 614L and 614R that are Y-shaped when viewed from the driver and that face the spaces between the lower sides of the spoke parts 25L and 25R and the rim-inner-circumferential portion 21. Due to this feature, lines of electric force passing below the spoke parts 25L and 25R in the rim part 20 can be induced. Therefore, it is possible to accurately detect hands of the driver that are in contact with or approach the rim part 20, thereby contributing to improvement of traffic safety.

(6) In the steering device 1, the second electrode portion having the plane facing the driver is provided adjacent to the rear surface side of the auxiliary equipment operation console units 5L and 5R. Due to this feature, many lines of electric force can be induced near the spoke parts 25L and 25R. Therefore, it is possible to also detect hands of the driver that are in contact with or approach the spoke parts 25L and 25R, thereby contributing to improvement of traffic safety.

Second Embodiment

Next, a steering device according to a second embodiment of the present invention is described with reference to the drawings. In the following description, the same components as those of the steering device according to the first embodiment are denoted by the same reference signs, and detailed description of the same components will be omitted.

Figure 5:
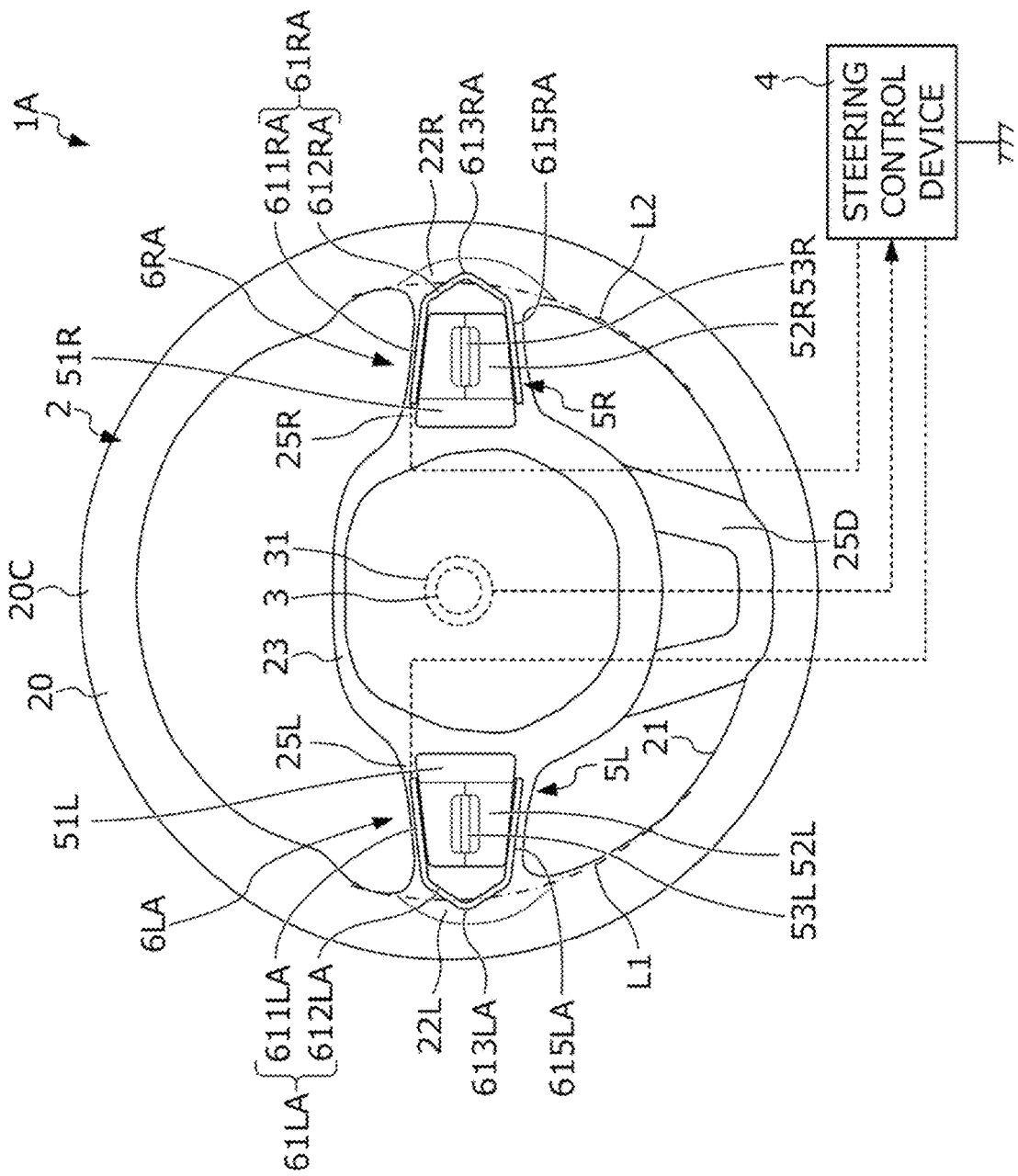
FIG. 5 is a diagram illustrating a configuration of a steering device according to a second embodiment of the present invention.

FIG. 5 is a diagram illustrating a configuration of a steering device 1A according to the present embodiment. The steering device 1A is different from the steering device 1 according to the first embodiment in configurations of electrode devices 6LA and 6RA provided in the spoke parts 25L and 25R and the spoke connection portions 22L and 22R. More specifically, the steering device 1A is different from the steering device 1 according to the first embodiment in configurations of first electrode portions 61LA and 61RA of the electrode devices 6LA and 6RA.

As illustrated in FIG. 5, the first electrode portions 61LA and 61RA provided in the spoke parts 25L and 25R has a C-shape when viewed from a driver. Specifically, the first electrode portions 61LA and 61RA include first flat portions 611LA and 611RA that are provided along first sidewall surfaces belonging to the auxiliary equipment operation console units 5L and 5R and located upward as viewed from the driver and that have planes facing the rim-inner-circumferential portion 21, second flat portions 612LA and 612RA that are provided at positions separated outward in the radial direction from second sidewall surfaces belonging to the auxiliary equipment operation console units 5L and 5R and located outward in the radial direction when viewed from the driver, and third flat portions 615LA and 615RA that are provided along third sidewall surfaces belonging to the auxiliary equipment operation console units 5L and 5R and located downward as viewed from the driver and that have planes facing the rim-inner-circumferential portion 21.

As illustrated in FIG. 5, the second flat portions 612LA and 612RA are each bow-shaped when viewed from the driver. Radially outermost portions 613LA and 613RA, which are the portions most distant from the hub part 23 in the radial direction in the second flat portions 612LA and 612RA are disposed further outside in the radial direction than the virtual lines L1 and L2.

The steering device 1A according to the present embodiment exerts the following effects in addition to (1) to (3) described above.

(7) In the steering device 1A, the first electrode portions 61LA and 61RA are C-shaped when viewed from the driver and include: the first flat portions 611LA and 611RA provided along the first sidewall surfaces that belong to the auxiliary equipment operation console units 5L and 5R and are located upward when viewed from the driver, and having the planes that face the rim-inner-circumferential portion 21; the second flat portions 612LA and 612RA provided at the positions separated outward in the radial direction from the second sidewall surfaces that belong to the auxiliary equipment operation console units 5L and 5R and are located outward in the radial direction when viewed from the driver; and the third flat portions 615LA and 615RA provided along the third sidewall surfaces that belong to the auxiliary equipment operation console units 5L and 5R and are located downward when viewed from the driver, and having the planes that face the rim-inner-circumferential portion 21.

Due to this feature, in the steering device 1A, many lines of electric force can be induced in a vicinity of a portion in a range of 60° to 120° of the annular rim part 20 that can be gripped by the right hand of the driver and in a vicinity of a portion in a range of 240° to 300° of the annular rim part 20 that can be gripped by the left hand of the driver. Therefore, it is possible to accurately detect the hands of the driver that are in contact with or approach the ranges of the rim part 20, thereby contributing to improvement of traffic safety.

Embodiments of the present invention have been described above. However, the present invention is not limited to the embodiments. The specifics of the configurations may be changed as appropriate within the spirit of the present invention.

EXPLANATION OF REFERENCE NUMERALS 1, 1a steering device
2 steering wheel
20 rim part
21 rim-inner-circumferential portion
22L left spoke connection portion (connection portion)
22R right spoke connection portion (connection portion)
23 hub part
25L left spoke part
25R right spoke part
3 steering shaft
4 steering control device (controller)
5L left auxiliary equipment operation console unit (auxiliary equipment operation console)
6L, 6LA left electrode device (electrode)
61L, 61LA first electrode portion
611L, 611LA first flat portion
612L, 612LA second flat portion
613L, 613LA radially outermost portion
614L plane
615LA third flat portion
62L second electrode portion
5R right auxiliary equipment operation console unit (auxiliary equipment operation console)
6R, 6RA right electrode device (electrode)
61R, 61RA first electrode portion
611R, 611RA first flat portion
612R, 612RA second flat portion
613R, 613RA radially outermost portion
614R plane
615RA third flat portion

The invention claimed is:

1. A steering device that receives steering operation by a driver, the steering device comprising:
a steering wheel including an annular rim part, a hub part provided inside the rim part, and a spoke part extending in a radial direction of the rim part and connecting the hub part to a rim-inner-circumferential portion of the rim part;
an electrode provided in the steering wheel; and
a controller configured to detect a change in capacitance of the electrode,
the electrode including a first electrode portion provided in a connection portion which belongs to the rim-inner-circumferential portion and to which the spoke part is connected, and
a radially outermost portion that is a portion most distant from the hub part in the radial direction in the first electrode portion is disposed further outside in the radial direction than an arc-shaped virtual line that is in contact with a contour line of the rim-inner-circumferential portion located above the spoke part when viewed from the driver and a contour line of the rim-inner-circumferential portion located below the spoke part when viewed from the driver.

2. A steering device that receives steering operation by a driver, the steering device comprising:

a steering wheel including an annular rim part, a hub part provided inside the rim part, and a spoke part extending in a radial direction of the rim part and connecting the hub part to a rim-inner-circumferential portion of the rim part;

an electrode provided in the steering wheel; and a controller configured to detect a change in capacitance of the electrode, the electrode including a first electrode portion provided in a connection portion which belongs to the rim-inner-circumferential portion and to which the spoke part is connected, wherein the spoke part is provided with an auxiliary equipment operation console that receives auxiliary equipment operation by the driver, and the first electrode portion includes: a first flat portion provided along a first sidewall surface that belongs to the auxiliary equipment operation console and is located upward when viewed from the driver, the first flat portion having a plane that faces the rim-inner-circumferential portion and; and a second flat portion provided at a position separated outward in the radial direction from a second sidewall surface that belongs to the auxiliary equipment operation console and is located outward in the radial direction when viewed from the driver.

3. The steering device according to claim 2, wherein the second flat portion has a lower end as viewed from the driver, and the lower end is Y-shaped and has a plane facing a space between a lower side of the spoke part as viewed from the driver and the rim-inner-circumferential portion.

4. The steering device according to claim 2, wherein the electrode further includes a second electrode portion provided adjacent to a rear surface side of the auxiliary equipment operation console and having a plane facing the driver.

5. A steering device that receives steering operation by a driver, the steering device comprising:

a steering wheel including an annular rim part, a hub part provided inside the rim part, and a spoke part extending in a radial direction of the rim part and connecting the hub part to a rim-inner-circumferential portion of the rim part;

an electrode provided in the steering wheel; and a controller configured to detect a change in capacitance of the electrode, the electrode including a first electrode portion provided in a connection portion which belongs to the rim-inner-circumferential portion and to which the spoke part is connected, wherein the spoke part is provided with an auxiliary equipment operation console that receives auxiliary equipment operation by the driver, and the first electrode portion includes: a first flat portion provided along a first sidewall surface that belongs to the auxiliary equipment operation console and is located upward when viewed from the driver, the first flat portion having a plane that faces the rim-inner-circumferential portion; a second flat portion provided at a position separated outward in the radial direction from a second sidewall surface that belongs to the auxiliary equipment operation console and is located outward in the radial direction when viewed from the driver; and a third flat portion provided along a third sidewall surface that belongs to the auxiliary equipment operation console and is located downward when viewed from the driver, the third flat portion having a plane that faces the rim-inner-circumferential portion.

* * * * *